Dec. 2, 1941.  A. H. DICKINSON  2,264,622
RECORD CONTROLLED MULTIPLYING MACHINE
Filed Nov. 4, 1938  10 Sheets-Sheet 1

Arthur H. Dickinson
INVENTOR

BY
Cooper, Kerr & Dunham
ATTORNEYS

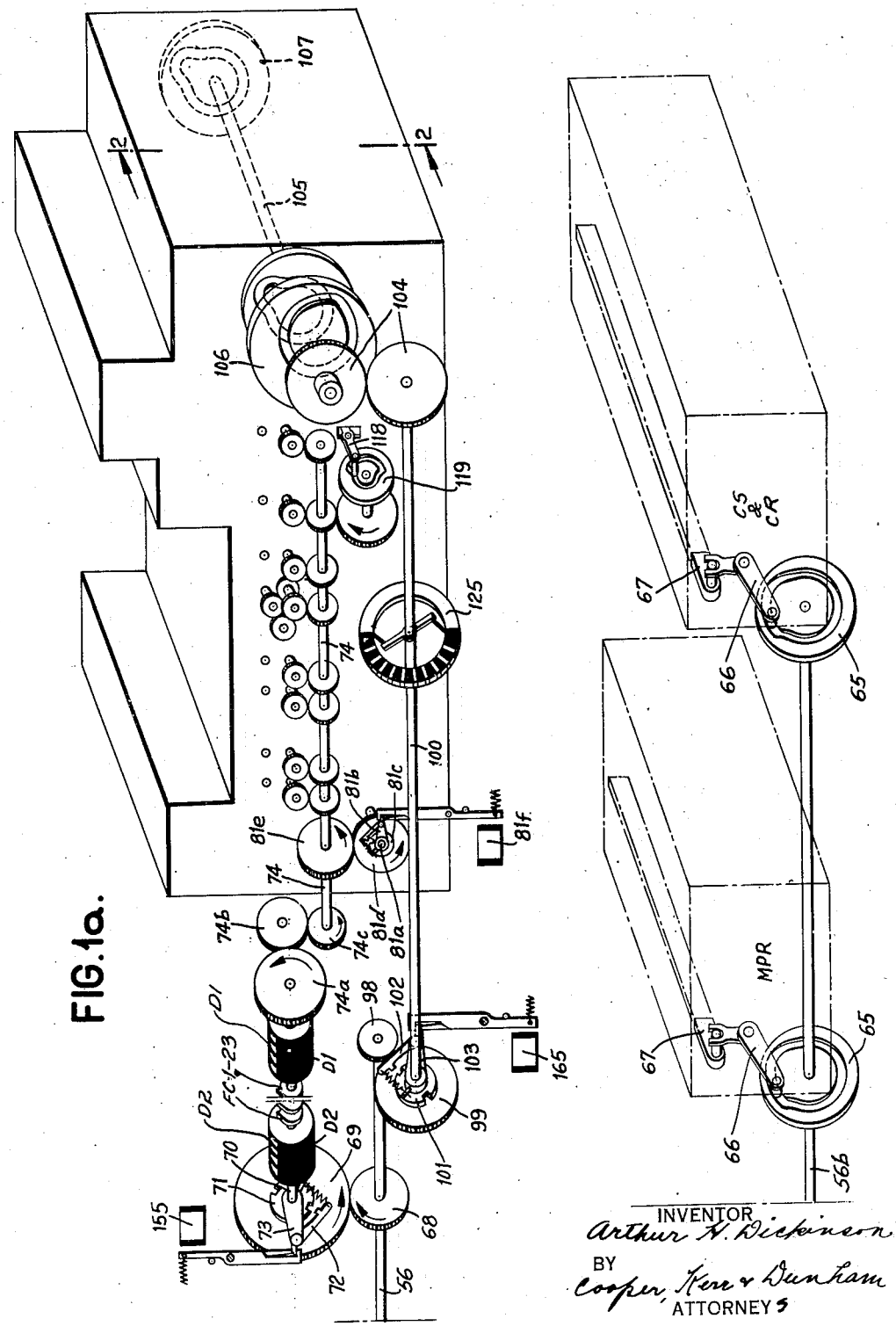

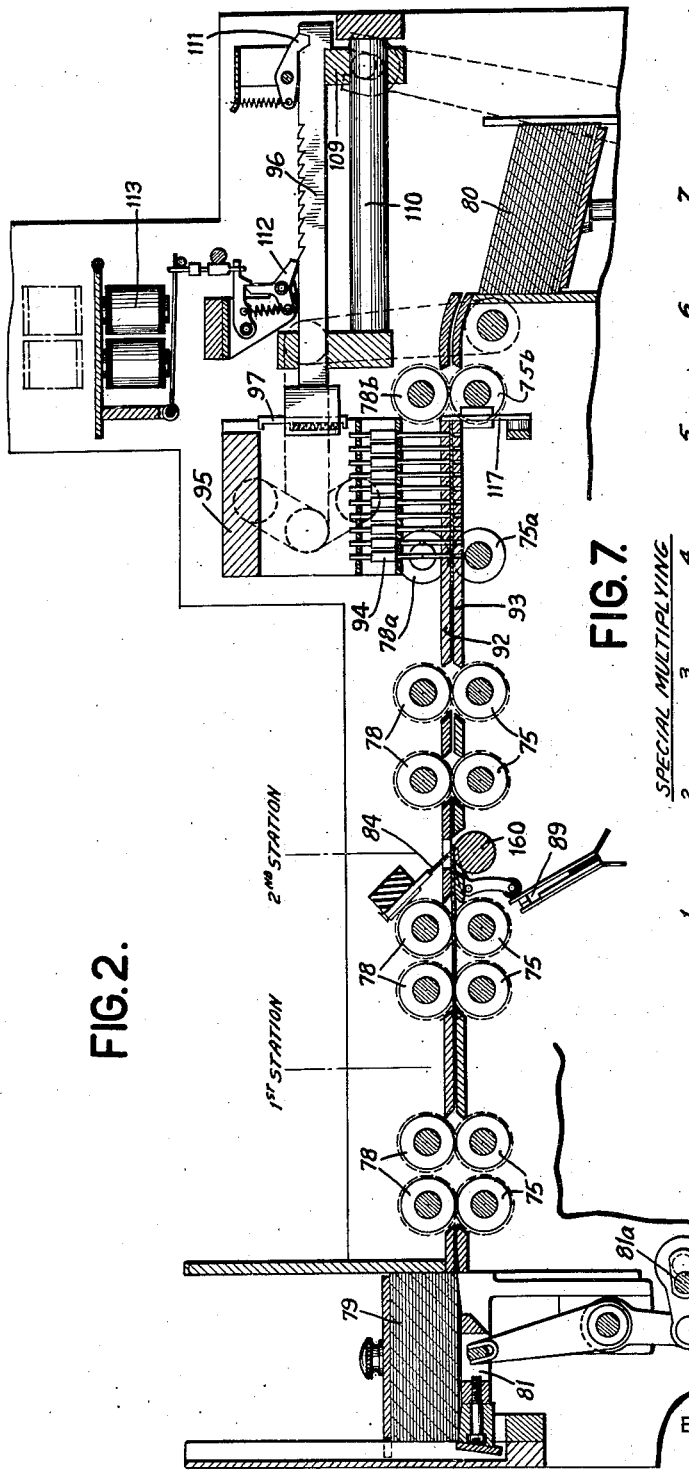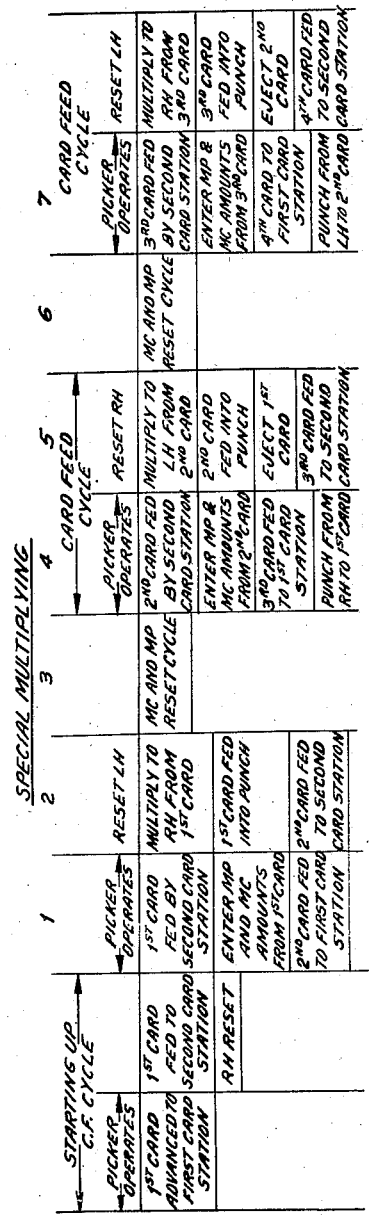

Dec. 2, 1941.  A. H. DICKINSON  2,264,622
RECORD CONTROLLED MULTIPLYING MACHINE
Filed Nov. 4, 1938  10 Sheets-Sheet 4

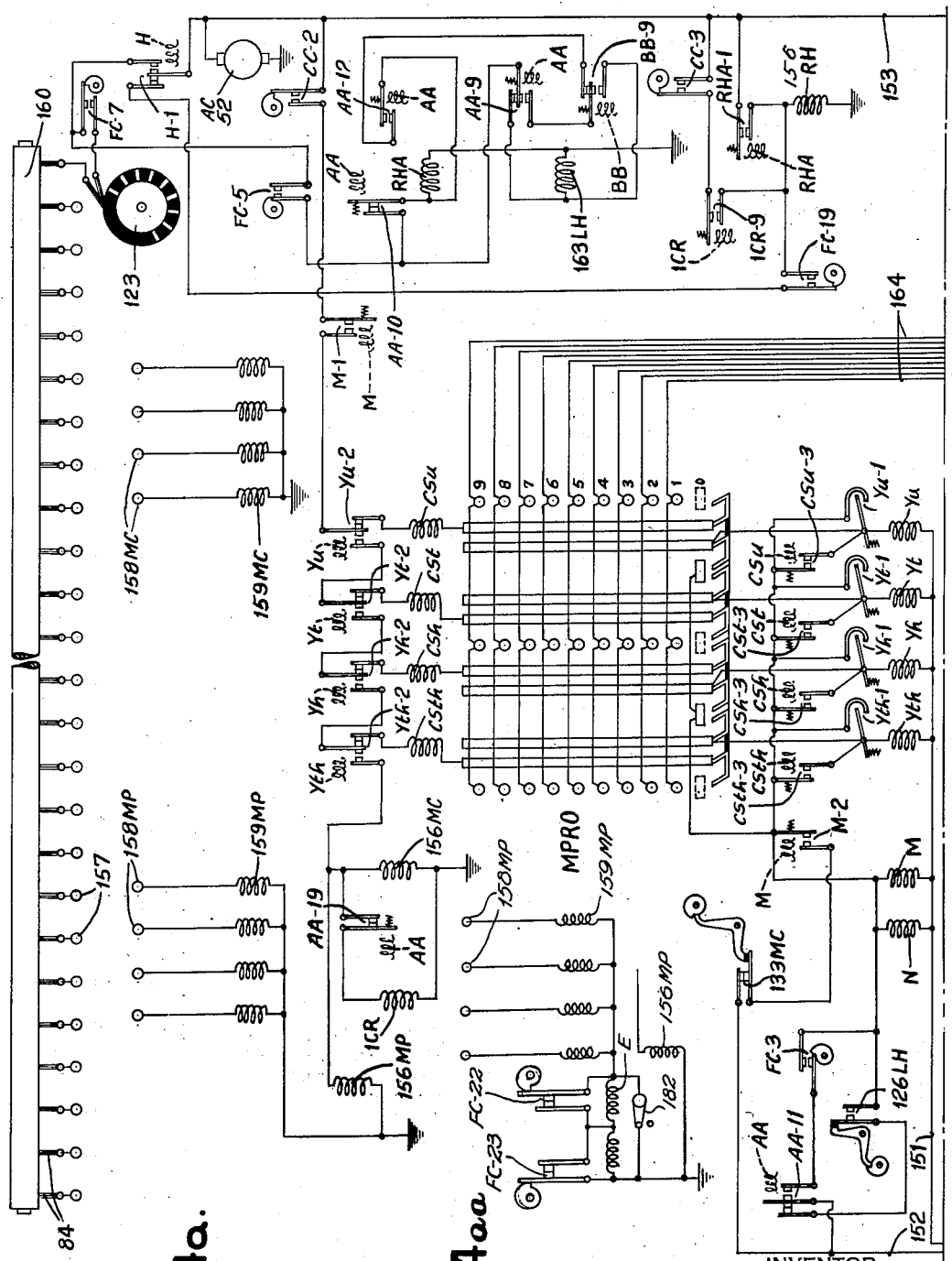

Dec. 2, 1941.   A. H. DICKINSON   2,264,622
RECORD CONTROLLED MULTIPLYING MACHINE
Filed Nov. 4, 1938   10 Sheets-Sheet 7

INVENTOR
Arthur H. Dickinson
BY
Cooper, Kerr & Dunham
ATTORNEYS

Dec. 2, 1941.  A. H. DICKINSON  2,264,622
RECORD CONTROLLED MULTIPLYING MACHINE
Filed Nov. 4, 1938  10 Sheets-Sheet 8

INVENTOR.
Arthur H. Dickinson
BY
Cooper, Kerr & Dunham
ATTORNEYS

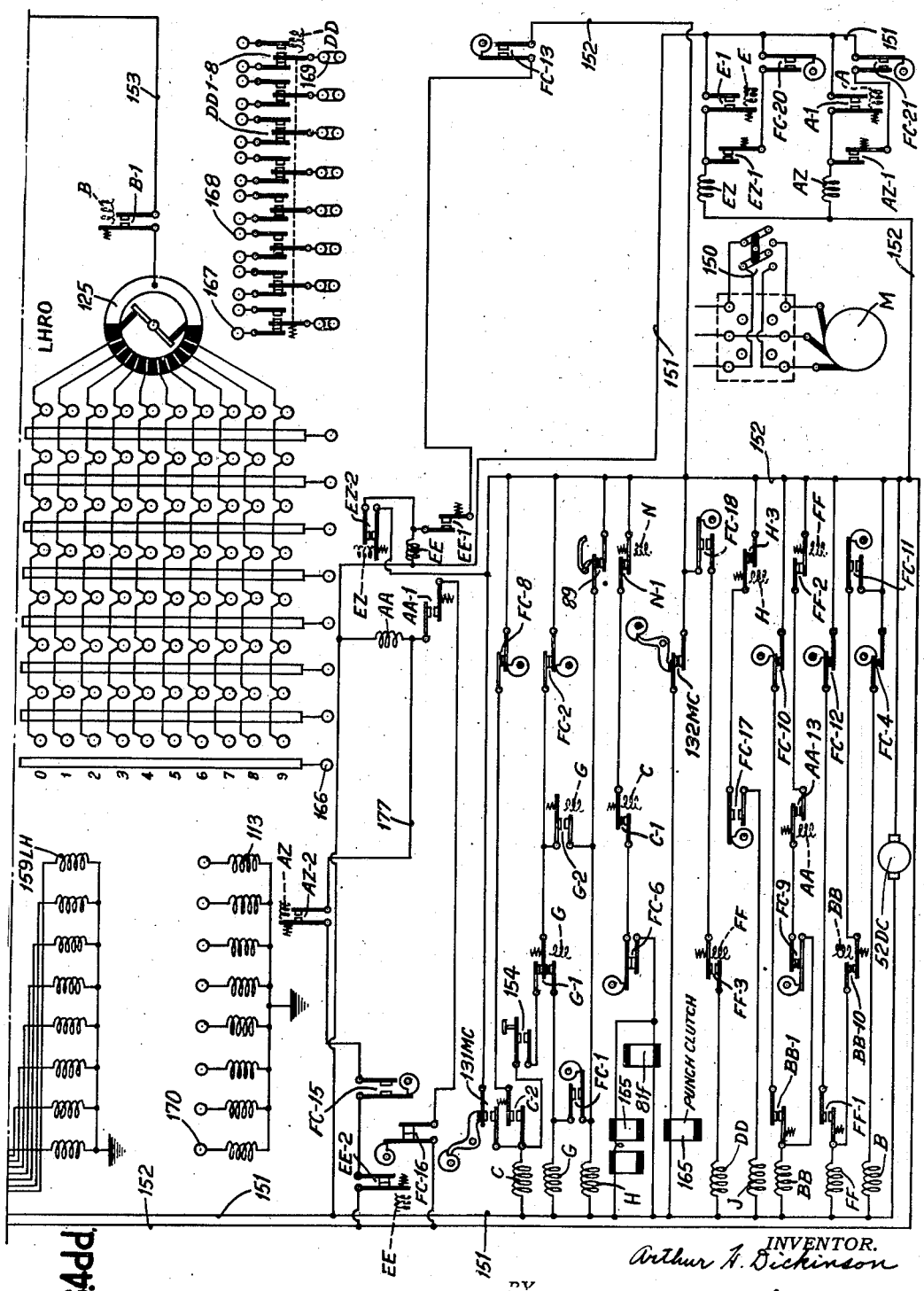

Dec. 2, 1941.    A. H. DICKINSON    2,264,622
RECORD CONTROLLED MULTIPLYING MACHINE
Filed Nov. 4, 1938    10 Sheets-Sheet 10

INVENTOR.
Arthur H. Dickinson
BY
Cooper, Kerr & Dunham
ATTORNEYS

Patented Dec. 2, 1941

2,264,622

UNITED STATES PATENT OFFICE 2,264,622

RECORD CONTROLLED MULTIPLYING MACHINE

Arthur H. Dickinson, Bronxville, N. Y., assignor to International Business Machines Corporation, New York, N. Y., a corporation of New York Application November 4, 1938, Serial No. 238,775

15 Claims. (Cl. 235—61.10)

This invention relates to record controlled multiplying machines and has for its principal object the provision of novel controls for machines of this class which will enable such machines to operate for certain special computations with a higher operating speed than has heretofore been attainable. Operating speed in record controlled calculating machines involves the time required for card handling and recording and the time required for computing. Computing cycles may be considered as comprising the product accumulator reset cycle, the actual partial product component entering cycles and an RH to LH transfer cycle. Previous partial product machines required at least three machine cycles for computing even for a multiplier amount of 0001 or 0010 or 0100 or 1000. Such computing cycles included an LH reset cycle, a partial product entering cycle and an RH to LH transfer cycle.

When any multiplicand amount is multiplied by 1 the product amount includes no left hand component and accordingly, only one product receiving device is required to receive the computed product. No RH to LH transfer cycle is required if the result can be read out for recording from the RH accumulator. Furthermore, since two product accumulators are available for other computations an entry may be effected in one accumulator in a machine cycle in which the other accumulator which is then not receiving an entry is being reset. By properly utilizing and modifying the machine controls for product entry, result readout and for reset of the result accumulators, overall saving of cycle time may be attained for certain special computations.

The present invention has for its object the provision of machine controls to enable operating time to be automatically saved when special computations are being performed which allow saving of machine operating time.

A further object of the present invention resides in the provision of a construction adapted to detect that the multiplier factor includes a significant digit of 1, or significant digits of 1 in a plurality of orders and that the multiplier factor lacks any significant digits from 2 to 9 and to specially control the machine operation to save operating time when such factor relations are detected.

A further object of the present invention resides in providing improved controls for a record controlled accounting machine which will automatically change the normal sequence of operation cycles to a different sequence of operating cycles when the calculating which is being performed is such that change of sequence may be effected with attendant saving of cycle time.

A further object resides in the provision of an improved operation sequence cycle controller for a record controlled calculating machine.

A further object of the present invention resides in the provision of a construction of record controlled multiplying machines with dual result accumulators and with means for alternating the entries of products pertaining to successive cards into said accumulator.

Another object resides in the provision of a record controlled accounting machine with dual product accumulators and result recording devices with means for alternating the readout relations between the product accumulator and recording devices for successive cards of a run.

A further object of the present invention resides in the provision of improved reset control for a dual accumulator accounting machine which will alternate accumulator reset for successive cards of a run.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Figures 1 and 1a, taken together with Fig. 1a to the right of Fig. 1, show a diagrammatic view of the various units of the machine and their driving devices;

Fig. 2 is a central transverse sectional view of the card handling, reading and punching section of the machine. This section is taken substantially on line 2—2 of Fig. 1a;

Figure 4B:
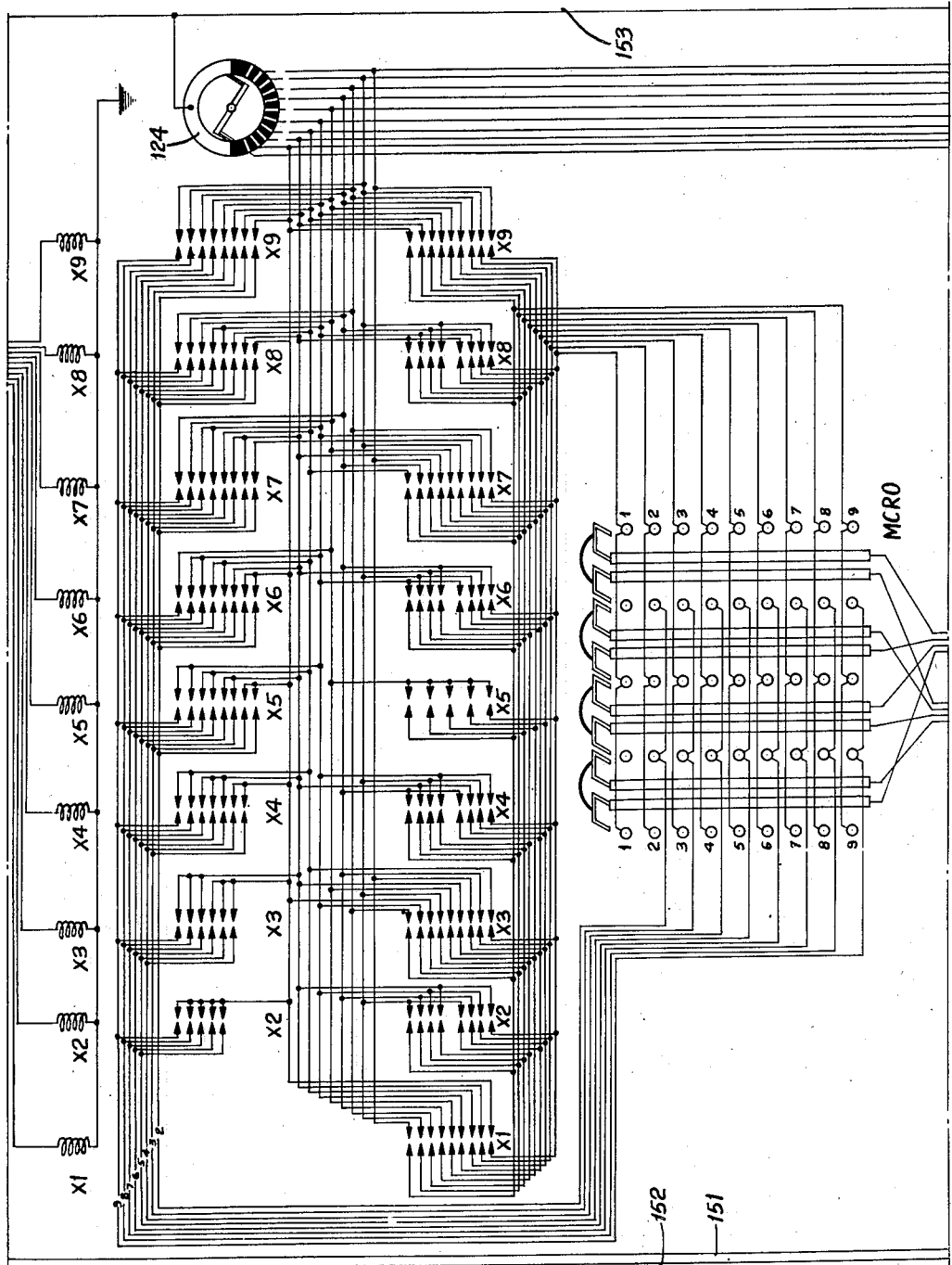
Figure 4C:
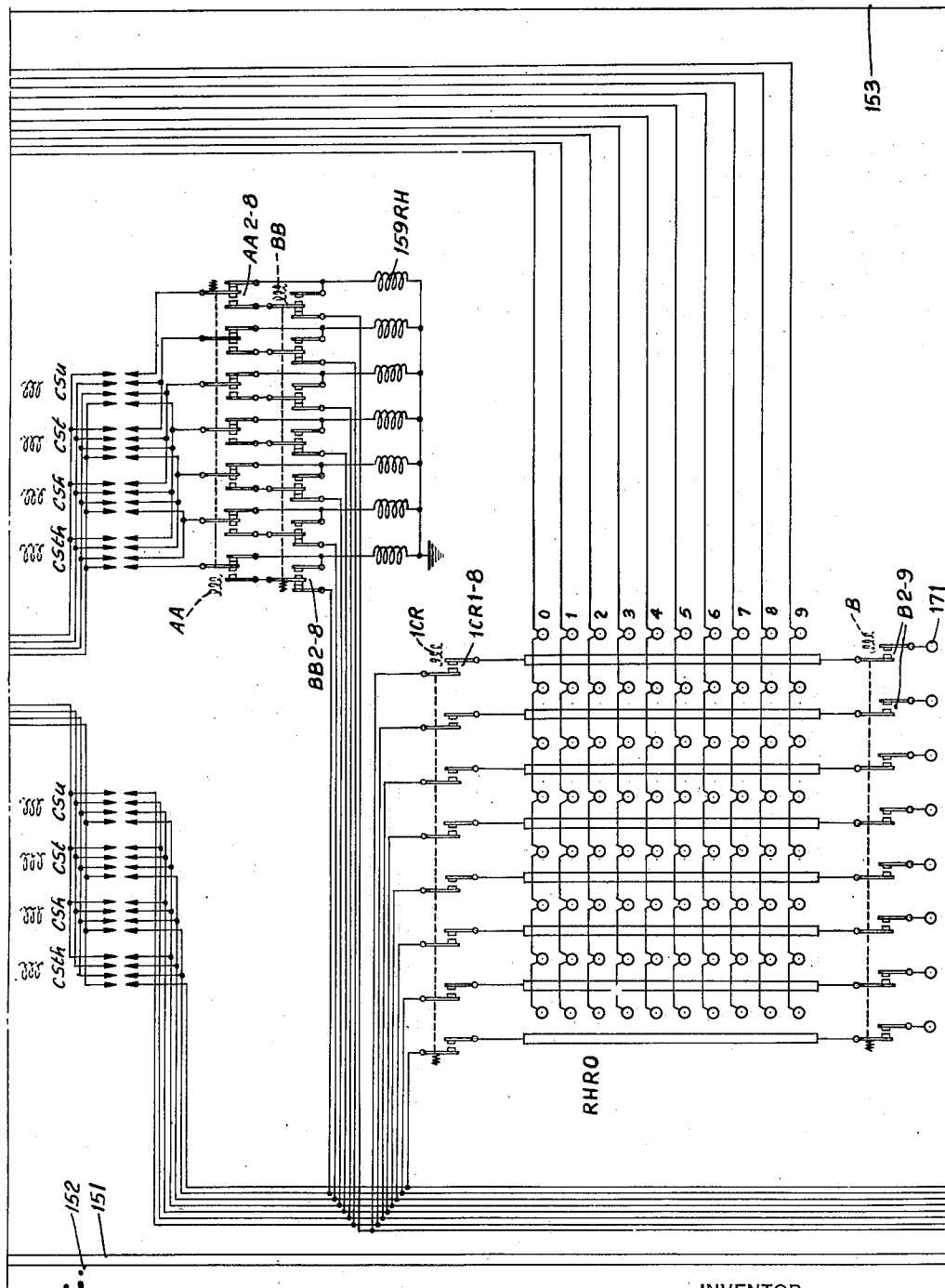
Figure 4D:
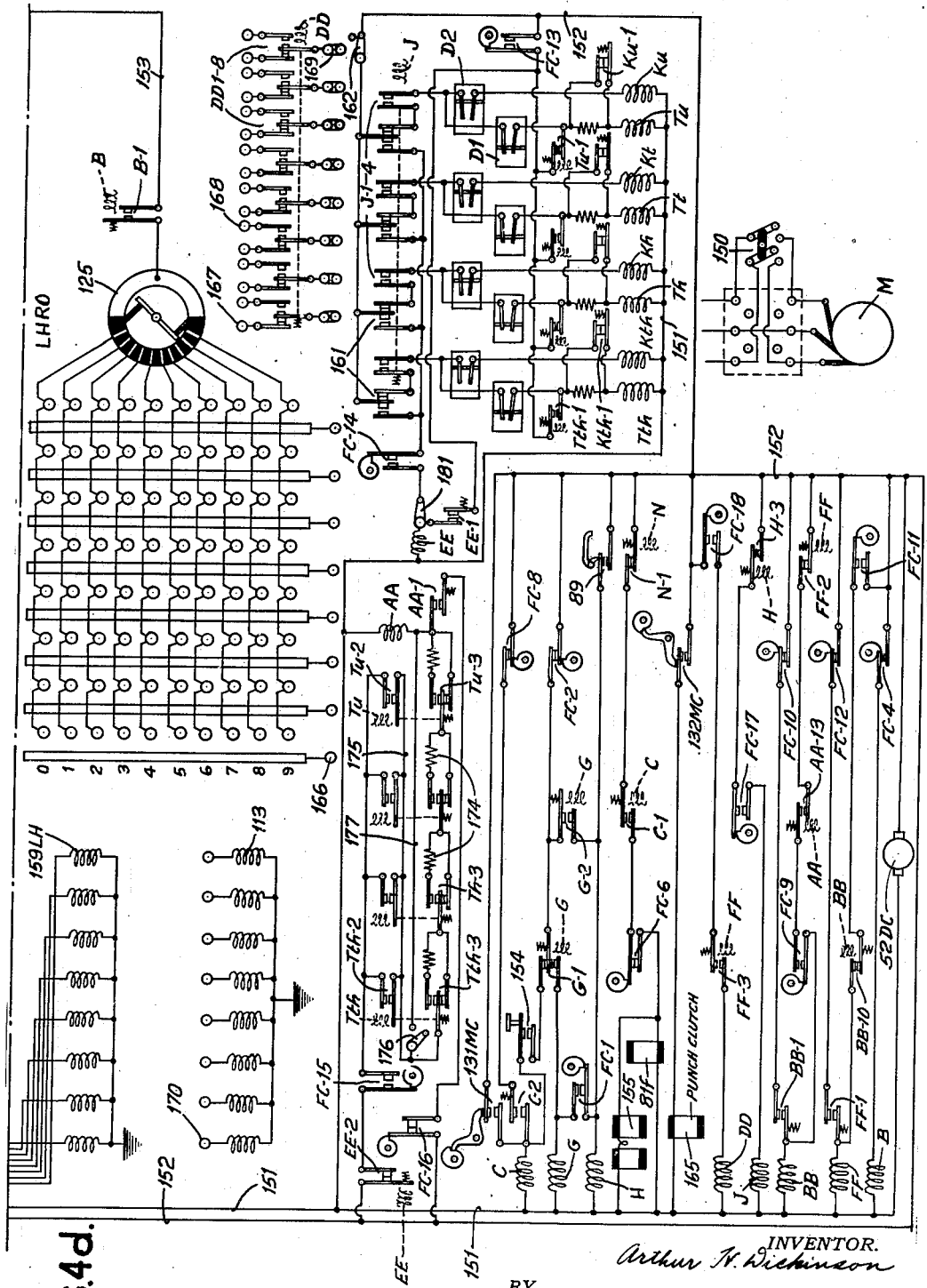
Figures 5, 6:
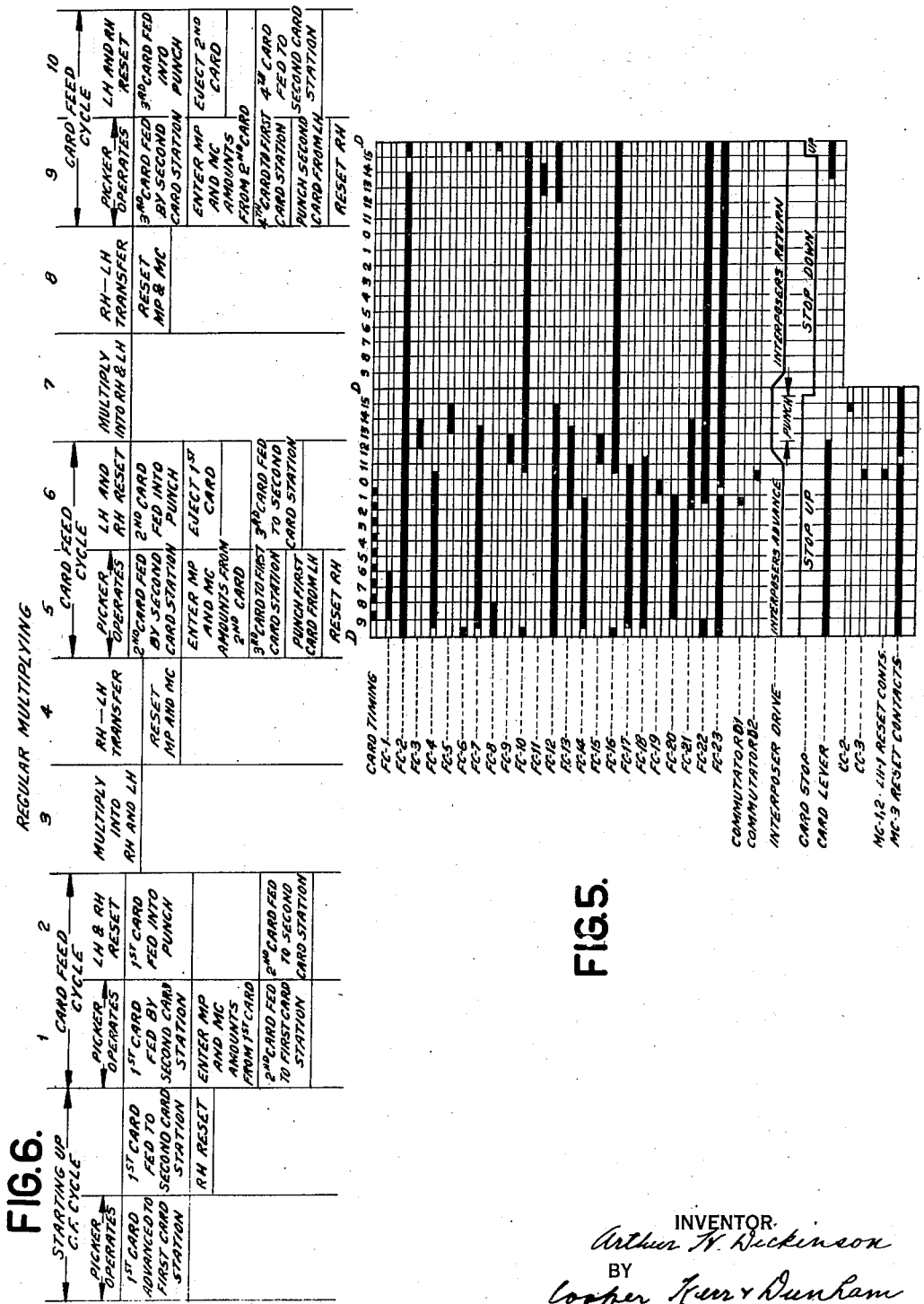

Figs. 4a, 4b, 4c and 4d, taken together and arranged vertically in the order named show the complete circuit diagram of the machine which forms an embodiment of the present invention;

Fig. 4a, modified in accordance with Fig. 4aa, Fig. 4b, Fig. 4c and Fig. 4dd, taken together and arranged vertically in the order named, show a complete circuit diagram of a machine incorporating a modified embodiment of the present invention;

Fig. 5 is a timing diagram; and

Figs. 6 and 7 are operation sequence diagrams; Fig. 6 shows the sequence of operations for regular multiplying operations and Fig. 7 shows the special sequence of operations for special cards.

In general the card handling, reading and punching section of the machine is similar to that shown in United States patent to Bryce No. 2,106,477.

The machine includes a card feed, card handling and punching section which is shown in the upper right hand corner of Fig. 1a and also shown in transverse cross-section in Fig. 2.

The punching mechanism as in the Bryce patent is of the gang punch type. The machine also includes a number of accumulators as follows: In the upper part (see Fig. 1) of the machine there is an RH accumulator and an LH accumulator. In the lower part of the machine there is an MC and an MP entry receiving device. These accumulators are driven in the customary manner. The machine also is provided with a multiplying panel relay unit generally designated MPR in Fig. 1a and there is a column shift and control unit designated CS and CR.

Machine drive

The machine is driven by a constantly running motor M which drives an A. C.-D. C. generator 52. The usual vertical driving shaft 54 is provided, which drives the upper counter drive shaft 56 and the lower counter drive shaft 56b in the customary manner. The usual Geneva drive is also provided for the upper reset shaft 63 and for the lower reset shaft 63b. The lower drive shaft 56b also extends to the right and drives operating cams 65 which operate bell crank follower members 66 and slidably shift serrated operating bars 67 for the multi-contact relay devices.

The entry receiving device for the multiplier and the multiplicand and the LH and RH product accumulators are of the usual type as customarily used in tabulating machines and are provided with electromagnetically operated clutches. The various accumulators and entry receiving devices have readout devices of the customary type, such as those described in United States patent to Daly et al. No. 2,097,145. The MP entry receiving device is provided with the so-called list contacts which are of the general type shown in Fig. 3 of United States patent to Lake, No. 1,534,531.

The multiplying relays and column shift relays are of the customary electromechanical type, for example, those shown and described in Bryce Patent No. 2,062,119 (see Figs. 4 and 5) or they may be of the type shown in the Daly et al. Patent No. 2,097,145.

Card feed, reading and punching unit drive

Figure 3:
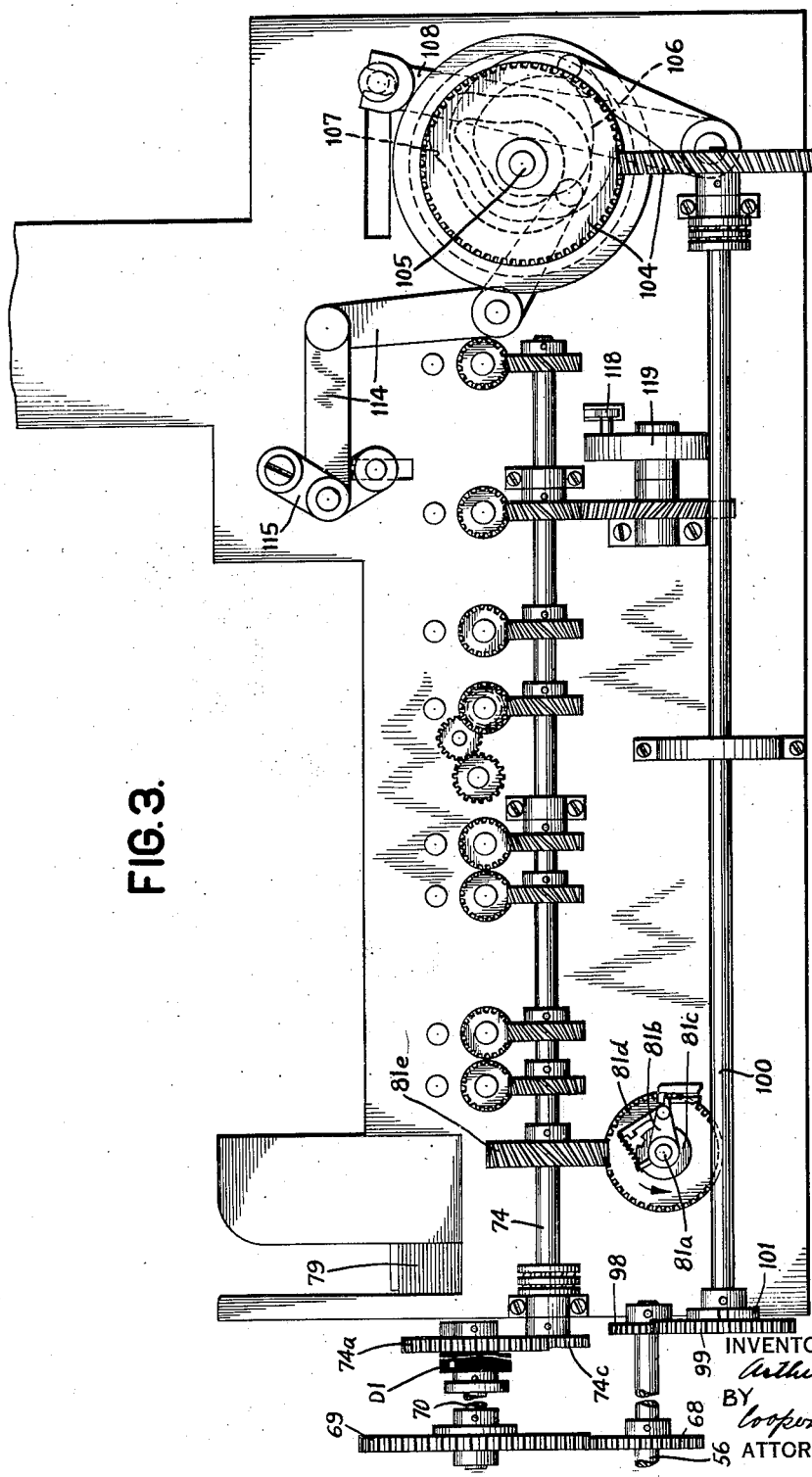
Fig. 3 is an enlarged front elevational view of the card handling, reading and punching section of the machine.

Referring to Figs. 1a and 3, the shaft 56 at its extreme right hand end is provided with a gear 68 which drives a gear 69 freely rotatable upon a shaft 70, but having fast to it a notched element 71 of a one revolution clutch. The driving relation between 69 and 68 is two to one in place of the one to one drive of the machine shown in the above mentioned Bryce patent. The complemental part of the one revolution clutch comprises a pawl 72 carried by an arm 73 which is fixed to shaft 70. This one revolution clutch is clutched up upon energization of magnet 155. The FC—1 to 23 cam contact devices are driven by a shaft 70, which shaft also drives two commutator assemblies designated D—1 and D—2. A drive shaft 74 is driven through reducing gearing 74a, 74b and 74c from shaft 70. The drive ratio of the 74a, 74b and 74c gearing is one to two between 70 and 74. Accordingly, the counter drive shaft 56 rotates in unison with drive shaft 74 and commutator drive shaft 70 makes one revolution for two revolutions of shaft 56 and shaft 74. The usual spiral gearing drives the lower feed rolls 75, 75a, 75b (see Fig. 2). The shaft 74 also drives contact roll 160 by gearing 160a which is driven by one of the gears driving one of the rolls 75 (see Fig. 3). Upper feed rolls 78, 78a and 78b are also provided driven in the customary manner. Preferably the rolls 75a and 78a and 75a and 75b are arranged to rotate at a slightly higher rate of speed than rolls 75 and 78, so that the rolls 75a, 78a will positively drive a card against stop 117. Upon withdrawal of the card stop after punching the card will be ejected from the punching die by the rapidly moving rolls 78b and 75b and delivered to the discharge stack. The machine is provided with a card supply magazine 79 and with the usual discharge hopper 80. A conventional picker 81 is provided. This is crank operated in the usual way from shaft 81a. A one revolution picker clutch is provided (Figs. 1a and 3). This includes an element 81c fast to a spiral gear 81d driven from a spiral gear 81e fast upon shaft 74. The one revolution picker clutch has the customary pawl adapted for release upon energization of a picker clutch magnet 81f. The picker clutch is provided in order that a card may be picked from the magazine in the first machine cycle of a card feed cycle which includes two machine cycles, i. e. two revolutions of counter drive shaft 56.

The card reading section of the machine comprises a single set of sensing brushes designated 84 (see Fig. 2). There is also provided a single set of card lever operated contacts 89.

The punch section comprises a punching die which includes upper and lower die plates 92 and 93. Sets of punches 94 are provided, suitably supported for sliding movement in a punch operating frame generally designated 95. There are also the customary interposer selector bars 96, each having a punch operating plunger 97, which plunger slides over the tops of the punches 94 and under the top of the punch operating frame 95.

The drive for the punching section of the machine will now be described.

Referring to Figs. 1a and 3, the shaft 56 is provided with a gear 98, which in turn drives a gear 99 freely rotatable on a punch operating drive shaft 100. Gear 99 has fast to it a notched element 101 of a one revolution clutch and the complemental part of this clutch includes pawl 102 carried by an arm 103 which is fixed to shaft 100. This one revolution clutch is of the customary type and is engaged upon energization of punch clutch magnet 165. When the clutch is engaged shaft 100 is turned through one complete revolution upon two revolutions of the counter drive shaft 56. In view of this two to one driving ratio the notched element 101 is provided with two notches to receive the pawl 102 in either of two positions. Shaft 100 through spiral gearing 104 (see Figs. 1a and 3) drives a cam shaft 105. This cam shaft is provided with an interposer cam 106 and punch operating cams 107. Interposer cam 106 is adapted to shift a crank follower 108 and shift a cross bail 109 back and forth on slide rods 110 (see Fig. 2). Interposers 96 are impositively driven from the cross member or bail 109 in any suitable manner as by spring pressed pawls 111. The interposers are selectively positioned over the punches by means of pawls 112 which engage ratchet teeth in the top of the interposer bars. Interposer pawls 112 are tripped by punch selector magnets 113. After one or more of the interposer bars have been selectively positioned under control of the punch selector magnets, the punches which are under the ends of the punch operating plungers 97 will be positively forced through the card by means of the punch operating cams 106 (Fig. 3). The cam follower cooperating with 106 shifts a linkage 114 which on shifting is adapted to operate a suitable operating means for the punch frame 95. This operating means is here shown as a toggle 115.

Referring to Fig. 2, it may be explained that it takes two machine cycles to bring a card from the card magazine 79 to a position in which the card is about to be read by the sensing brushes 84. On the following machine cycle the card is traversed by the brushes 84. On the following machine cycle the card will be fed into the punching die. The card is arrested in the punching die by means of the card stop 117, which stop cooperates with the pivoted arm 118 (see Fig. 1a) cooperating with box cam 119 driven by gearing affording a one to two drive from shaft 74. The configuration of the box cam is such as to provide the card stop movements shown on the timing diagram (Fig. 5). With the card stop 117 elevated, the card will be arrested in proper position in the punching die. The usual feed rolls urge the card into cooperation with the card stop. Upon withdrawal of the card stop the card will be ejected from the punching die by rolls 78b and 75b and delivered to the discharge stack.

*Emitters and cam contacts*

The main drive shaft 56 is adapted to drive cam contacts CC—2 and CC—3. There is also an impulse distributor 123. An emitter 124 is provided, driven from shaft 56 in the customary manner. Another emitter 125 is provided which has its brushes driven from the punch drive shaft 100 (see Fig. 1a).

*Reset controlled contacts*

Figure 1:
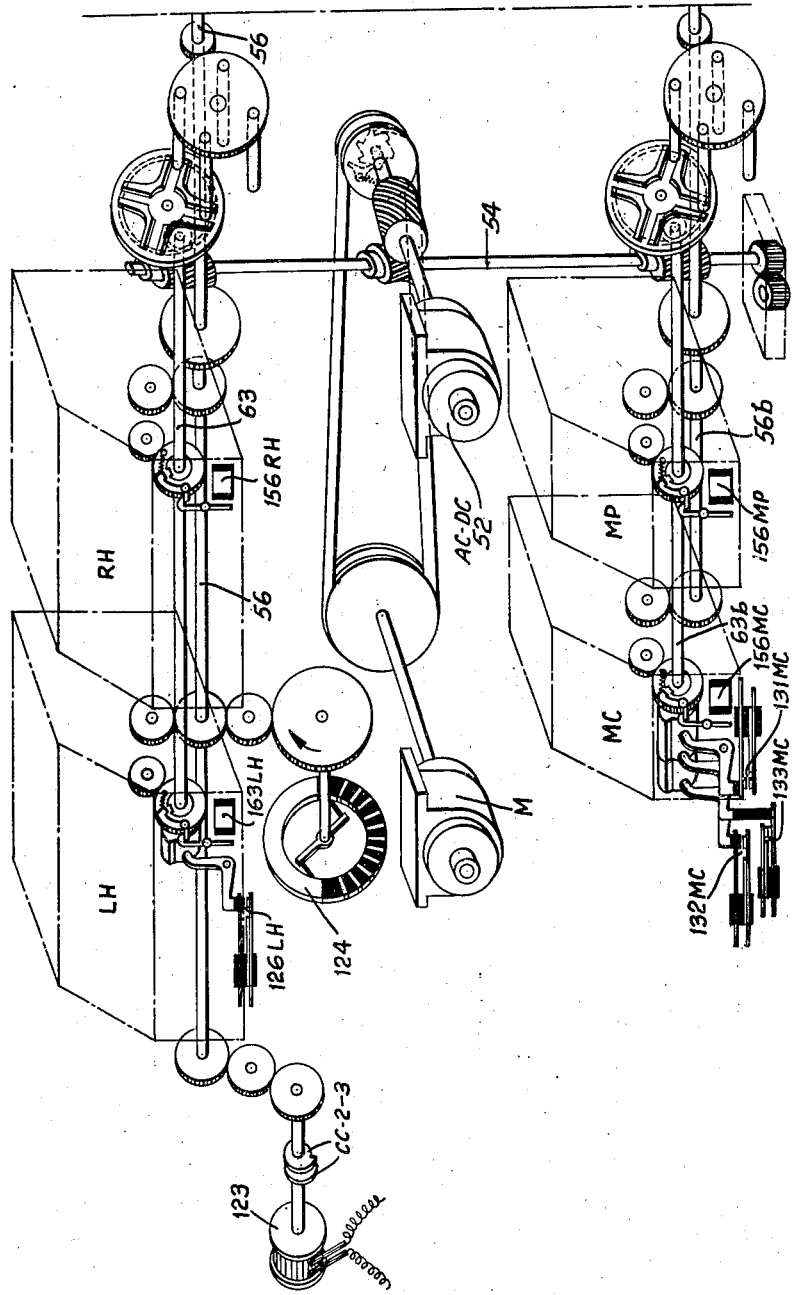

Referring to Fig. 1, the reset gear of the LH accumulator is provided with a cam, which, upon reset, is adapted to close normally opened contacts 126LH. The MC entry receiving device is provided with normally opened contacts 132MC and 131MC and normally closed contacts 133MC. These contacts all shift to reverse position upon reset of the MC entry receiving device.

Before describing the circuit diagram, certain timing conditions will be explained, both with reference to the present machine and with reference to prior art machines. In prior record controlled multiplying machines utilizing a successively acting type of punch, see for example Daly Patent No. 2,095,145, the sequence of machine cycles for a multiplication involving a two significant digit multiplier is as follows: The first machine cycle is an MC and MP entry cycle and an RH reset cycle. This cycle is also utilized for punching and the following machine cycle is also utilized for punching. In some instances, more than two machine cycles may be required for punching. When punching is completed the next machine cycle is an LH reset cycle. There then follows two multiplying cycles or partial product entering cycles. Thereafter there is an RH to LH transfer cycle and in this same cycle the MP and MC receiving devices are reset. With such a machine, assuming two machine cycles for punching, the total number of machine cycles required for the card handling computing and punching comprises six machine cycles.

Consider now the foregoing machine to be modified to employ a gang type of punch. Gang type punching may be effected in one machine cycle. Accordingly, the overall number of machine cycles may be reduced by one since punching may be effected in the MC and MP entry cycle and LH reset may immediately follow in the next ensuing machine cycle.

In current accounting practice, occasions frequently arise where the multiplier amount is one or ten or 100 or 1000. If such cards are calculated, the Daly type of machine would require only one partial product entering multiplying cycle. Consequently the cycle time would be five machine cycles per card and with a gang punch type of punch the cycle time would be four machine cycles per card. The actual number of computing cycles, considering RH to LH transfer, as a computing cycle is therefore two. There in one partial product entering cycle followed by an RH to LH transfer cycle.

If the machine were arranged to read out the product result from RH, a times one multiple of the multiplicand can be entered into RH during the LH reset cycle. By thus overlapping a times one entry of a product with LH reset one machine cycle may be saved. Furthermore RH to LH transfer is unnecessary, but a cycle is not saved by such elmination since such RH to LH transfer is also utilized for MP and MC reset.

With a machine operating in the above manner, provision must be made to alternately read out the product from RH and LH and furthermore provision must be made for an alternation and change of reset time of the result receiving accumulators. This will be more fully explained hereinafter.

Before describing the circuit diagram the sequence of machine operations for regular multiplying will be explained first. By regular multiplying in this explanation is meant "multiplying on computations wherein there are significant digit amounts other than one in the multiplier factor." For example, a multiplier amount of 246, 116, 19, etc., would be a regular multiplying operation. Special multiplying would be for calculating operations involving multiplier amounts such as 1, 100 or 1000 and other special multiplying operations would be for multiplier factor amounts of 1, 11, 111, 1111, etc.

The sequence of machine operations for regular multiplying will be apparent from the Fig. 6 sequence diagram.

It will be noted that the first two cycles are the starting up card feed cycle. The following ten cycles show the complete card handling and calculating operations for the first two cards of the run and the last two cycles marked 9 and 10 show the beginning of the card handling cycle for the third card.

It will be noted that punching of the result is overlapped in a following machine cycle pertaining to the following card. Accordingly, the cycle time per card for card handling and computing on regular multiplying with a one significant digit multiplier factor is four machine cycles per card.

Special multiplication

Fig. 7 will be described for a special multiplication and for purposes of explanation it will be assumed that the multiplier amount comprises a single digit of 1 on each of two following cards of a run.

The modification of machine operations can best be explained by comparing Figs. 6 and 7. In the second machine cycle it will be noted that RH reset occurs in Fig. 6, but it does not occur in Fig. 7. In such said second cycle there is an entry of a times one product into RH. Such entry occurs during the LH reset cycle. The third cycle now becomes an MC and MP reset cycle and there is no RH to LH transfer. The fourth cycle is again a card feed cycle with the entry of the multiplier and multiplicand from the second card into MP and MC. In such cycle the result is punched on the record, the result being derived from RH. Comparing this cycle with the fifth cycle of Fig. 6 it will be noted that RH reset is suppressed in the fourth cycle of Fig. 7 and allowed to take place in the fifth cycle of Fig. 5. RH reset in Fig. 7 occurs in the fifth cycle and in such cycle the times one product is entered into LH. In such fifth cycle there is no LH reset compared in the sixth cycle of Fig. 6. In the sixth cycle there is an MP and MC reset only. In the seventh cycle the result in LH is punched on the card, this operation overlapping card feed. The operation in the eighth cycle involved an LH reset with an entry of a times one product from the third card into RH again.

From the foregoing timing diagram it will be noted that only three machine cycles are required per card for a single digit multiplier involving a one as compared to four machine cycles per card for a regular multiplying operation.

Circuit diagram and operation

The machine operations will first be described for regular multiplying, that is, for operation wherein the multiplier amount in at least one column has a significant digit other than one. The machine operations will first be described for the main embodiment shown in the circuit diagram, Figs. 4a, 4b, 4c and 4d.

The pre-punched cards are first placed in the card magazine 79 (Fig. 2). The first operation comprises the closure of the switch 150 (Fig. 4d) providing a source of current supply for the main driving motor M. Rotation of the motor M starts the drive of the A. C.-D. C. generator 52 and supplies direct current to the D. C. buses 151 and 152. Alternating current impulses are likewise impressed upon bus 153 and to ground. Start key 154 (Fig. 4d) is now depressed, which completes a circuit from line 151 through relay coil C, through contacts G—1 in the position shown, through cam contacts FC—2 to the other side of the line 152. With relay C energized, stick contacts C—2 and cam contacts FC—8 provide a holding circuit for relay coil C. Energization of relay coil C also closes relay contacts C—1 and a circuit is completed traced as follows: From line 152, through relay contacts N—1 now closed, relay contacts C—1 now closed, through FC—6 now closed, to the card feed clutch magnet 155 and to the picker clutch magnet 81f and thence back to line 151. With the card feed clutch magnet 155 and the picker clutch magnet 81f energized, card handling cycles ensue. During this starting up card feed cycle cam contacts FC—4 close to energize relay coil B (Fig. 4d). The purpose of the relay coil B is to afford readout of a result for punching. At this stage of the operation this relay coil B is ineffective, since the punching mechanism is not in operation. During the first machine cycle of the card feed cycle, a circuit is completed from line 153 (Fig. 4a), through the relay contacts H—1 in the position shown, through the FC—19 cam contacts to energize the 156RH reset magnet. Energization of 156RH brings about the customary reset of the RH accumulator. Such reset actually is effected in the second machine cycle, but it is initiated in the first machine cycle. Near the end of the first card feed cycle card lever contacts 89 close and energize relay coil H (see Fig. 4d). With relay H energized the relay contacts H—1 (Fig. 4a) shift to reverse position and thus suppress repeated subsequent reset of RH under control of FC—19. The start key must now be again depressed or alternatively it may be held depressed for the required time to start up the machine. Accordingly, another card feed cycle is initiated. The picker clutch again operates to feed the second card from the hopper into the bite of the leading card feed rolls. The first card of the run will be fed past the sensing brushes 84 and the amount of the multiplier and multiplicand will be read from the card. Suitable plug connections will be made between the brush plug sockets 157 to the sockets 158MP and the sockets 158MC. The accumulator entry receiving means 159MP and 159MC will be energized in the customary way and the amount will be entered into the accumulator. The entry circuits for factor entry will now be traced. From line 153, through relay contacts H—1 now in shifted position, through the FC—7 cam contacts, via impulse distributor 123 to contact roll 160 (see also Fig. 2), thence via the plug board and plug sockets previously mentioned to the accumulator magnets 159MP and 159MC and thence to ground. Factor entries are effected in the first machine cycle of the second card feed cycle (see Fig. 6).

During the second card feeding cycle, upon closure of cam contacts FC—1, relay G becomes energized. Upon energization of relay coil G, the relay contacts G—1 shift, opening the start key circuit and providing a stick circuit for relay coil G in connection with the G—2 contacts which are now closed. Relay coils G and H remain energized as long as cards are feeding through the machine. When cards are exhausted, the card lever contacts 89 open whereupon G de-energizes upon opening of cam contacts FC—2. This same circuit control will also deenergize H.

During the first machine cycle of the second card feed cycle, cam contacts FC—17 close and the circuit is established from line 152, through the H—3 contacts now closed, through FC—17 to energize relay coil J. With relay coil J energized, relay contacts J1—4 all become closed. However, on a straight regular multiplying operation this J control need not be utilized. With such regular multiplying the operator would have first opened switch 162 which would cut off the list contact testing circuit.

During the first machine cycle of the second card feed cycle, cam contacts FC—5 (Fig. 4a) close. Accordingly, a circuit is established from line 153 through the H—1 contacts now shifted, through FC—5, through the AA—10 contacts now closed, through the relay coil RHA and back to ground. A branch circuit is also established through the AA—9 contacts in the position shown, through the 163LH reset magnet and back to ground. With relay RHA energized, relay contacts RHA become closed and a circuit is established from line 153 to energize the 156RH reset magnet. Reset of LH and RH now occurs, such reset occurring in the second machine cycle of the second card feed cycle. Upon LH reset, contacts 126LH (Fig. 4a) close, and a circuit is established from line 152, through the AA—11 contacts in the position shown, through 126LH now closed, through relay coils M and N and back to the other side of the line 151.

The column skip and cycle controller are fully described in the Daly Patent No. 2,045,437.

It may be stated that if any brush of the multiplier readout MPRO (Fig. 4a) stands upon a zero spot, the corresponding Y relay magnet will be energized. Current will flow in from line 152, through the 133MC reset contacts, through relay contacts M—2 now closed, via a wire to the zero spots of MPRO, thence via the corresponding brush or brushes standing on the zero spot or spots, thence through the respective circuits shown and back to the 151 side of the line. Also connected to one side of relay contacts M—2 is a line which extends over and connects with one side of the CSu—3 to CSth—3 control contacts. The other side of these contacts are wired back to their respective relay coils and therethrough to the other side of the D. C. line. Accordingly, when any Y coil is energized, due to a brush standing on a zero brush in its corresponding column, the energization of this particular Y relay coil will close its Y—1 stick contacts, and the Y relay will remain energized. Assuming that the multiplier amount is 0019, there will be an energization of coils Yth and Yh and their transfer contacts Yth—2 and Yh—2 will shift to reverse position. Yu—2 and Yt—2 will not have been shifted because their corresponding Y relays were not energized.

The machine is now ready to multiply by the amount in the units order of the MP entry device. Initiation of multiplication is brought about as follows: Upon energization of M, relay contacts M—1 close and following the setting up of the cycle controller cam contacts CC—2 close and current flows through these contacts through the M—1 contacts now closed, through the Yu—2 transfer contacts in the position shown, down through the CSu relay magnet and out via the brush which is standing on the "9" spot of MPRO in the units order, down through the ninth line of the group of wires generally designated 164 to the X—9 multiplying relay magnet (see Fig. 4b). There will be a concurrent energization of CSu and X—9. Energization of X—9 selects the proper impulses for multiplication by 9 and the energization of CSu directs the entries into the proper columnar orders of the RH and LH accumulators. The flow of partial product representing impulses need not be traced in detail. It is sufficient to state that the impulses emitted by emitter 124 flow through the X—9 multiplier relay contacts and thence through the MCRO readout in the customary way.

The LH component impulses flow direct to the 159LH accumulator magnets, Fig. 4d, after passing the column shift contacts. The impulses which flow to 159RH after passing through the column shift contacts (see Fig. 4c) pass through relay contacts AA2—8 which are in the position shown for this kind of an operation. Extra control contacts CSu—3 are provided controlled by the CSu relay and the closure of these contacts takes place as an incident to the flow of current to the X—9 multiplier relay. With such contacts closed, there is an energization of the Yu relay, which relay was not previously energized because there was a significant digit in the units order of the multiplier. The energization of Yu shifts stick contacts Yu—1 and transfer contacts Yu—2 so that upon the succeeding multiplication by the next significant digit, the current flowing in through M—1 and CC—2 will be diverted by the Yu—2 contacts over to the Yt—2 set of transfer contacts which are in the position shown, thence through the CSt column shift magnet, to the one spot in the tens order of MPRO and thence to the X—1 multiplier relay magnet. The entry of the product will then be effected in the manner previously explained above for the preceding order.

After multiplication is complete the transfer circuits in the cycle controller will all be shifted so that there is an ultimate circuit path from the 153 A. C. line, through CC—2, M—1, through all of the shifted Y—2 set of contacts, to the 156MC reset magnet, the 156MP reset magnet and back to ground. Another circuit is established to energize relay 1CR, through the AA—19 contacts which are in the position shown. Energization of 156MP and 156MC initiates MP and MC reset. Energization of 1CR brings about a closure of the related contacts 1CR1 to 8 (Fig. 4c) and 1CR—9 (Fig. 4a). Closure of 1CR1 to 8 connects RHRO with the lines leading to the LH accumulator magnets 159LH, Fig. 4d. Accordingly, upon the operation of the emitter 124, Fig. 4b, impulses are emitted through RHRO, Fig. 4c, through the 1CR1 to 8 contacts and such impulses flow to the 159LH accumulator magnets, Fig. 4d. The amount which previously stood in RH is transferred over and entered into LH in proper columnar relation therein. After the transfer operation is complete and with relay contacts 1CR9 (Fig. 4a) closed, upon closure of cam contacts CC—3 there is an energization of 156RH. This brings about RH reset, actual reset being effected in the cycle following the RH to LH transfer cycle (see Fig. 6). Upon MC reset, the reset control contacts 133MC, Fig. 4a, open to de-energize relay coils N and M in the customary manner. Upon MC reset the reset control contacts 131MC (Fig. 4d) close to re-energize relay coil C and bring about a further card feed. Also upon MC reset, contacts 131MC (Fig. 4d) close to energize punch clutch magnet 165. The card which was previously computed will have been fed to the punch and during the cycle in which the amounts are being derived from the following card, the previous result will be punched on the first card.

Before starting up the run, the operator will establish plug connections from sockets 166 (Fig. 4d) to the set of sockets 167 and from sockets 169 to sockets 170. During the reading in cycle for the following card, cam contacts FC—4 will again close, energizing relay coil B in the manner previously explained and with such relay energized, relay contacts B—1 will be closed, affording current supply to emitter 125. With the emitter 125 in operation, impulses will be emitted through LHRO and such impulses will flow through plug connections between sockets 166 and 167, thence through the DD1—8 relay contacts in the position shown, and thence via the plug connections 169 and 170 to the punch selector magnets 113. With these punch selector magnets differentially energized, the amount standing in LH will be punched back on the first record card.

The foregoing description has described the complete sequence of operations for regular multiplying wherein no special controls are afforded for a times one multiplication. It was explained that for this type of a run, the switch 162 (Fig. 4d) was thrown to open position. If the machine operator knows that in a particular run of cards many multiplier factors occur which involve only one or ten or one hundred, the operator will, before starting up the run, close switch 162, placing it in the position shown in Fig. 4d. The operator will also establish a further set of plug connections between sockets 168 (Fig. 4d) and sockets 171 (Fig. 4c).

Before describing the special computation operation, it may be explained that when the machine is run for special computations, the product result is derived alternately from RH and LH for successive cards of a run. The alternate derivation of the product from one or the other accumulators is afforded by the above mentioned plug connections and by the DD1—8 relay contacts. If the plug connections are made as stated above and if the DD—1 relay contacts are in the position shown, the product result which is recorded by the punch will be derived from LHRO. On the other hand, if the DD1—8 contacts are in shifted position, the product result will be derived from RHRO.

The manner of energizing the DD relay will be subsequently explained.

On special computations there is another change in machine control, which involves a change in the time of LH and RH reset. On regular multiplying (see Fig. 6) LH reset and RH reset occur concurrently in the second machine cycle of each card feed cycle. In addition there is a further RH reset which occurs for following cards in the first machine cycle of the card feed cycle.

Referring now to Fig. 7, it will be noted that the reset relations of LH and RH are changed in the following manner. For the first card, LH reset occurs in the second machine cycle of the second card feed cycle. RH reset occurs in the second machine cycle of the card feed cycle in which the second card is fed. This operation is maintained for following cards of the run. In short, there is an alternate RH and LH reset. Alternation of reset for special computations is brought about by the alternate energization of relay coil BB (see Fig. 4d) and by the energization of relay coil AA which occurs in every card feeding operation while special computations are being taken care of.

As stated previously, the MP entry receiving device is provided with the special shifting type of list contacts. On the circuit diagram these are shown at 161 (Fig. 4d). Each of the 161 contacts has its right hand blade serially connected with a J relay contact.

Referring to Fig. 4d, from line 152, there is provided in conjunction with the list contacts previously referred to a set of special testing circuits utilized for each order of the multiplier. These testing circuits in conjunction with the list contacts tell if a multiplier amount is such as 0019, wherein there is at least one significant digit in the multiplier other than one. Such multiplier amounts may be termed to fall in a first class or category. These testing circuits also set up a different control if the multiplier contains a single significant digit of one. Typical multipliers would be 1000, 100, 10 and 1. Such multiplier amounts are in a second class or category.

The test circuits also ascertain whether the multiplier is a multi-digital amount such as 11, 111 and 1111. Such multiplier amounts are in a third class or category. According to one and the main embodiment of the invention, multipliers of the latter category such as 11, 111 and 1111 are considered as being grouped with multipliers of the first category, viz. those containing in some order a significant digit other than one. For multipliers of the first and third categories, the machine is controlled to perform the sequence of operation which it performed in regular multiplying, but for multipliers of the second category, it is differently controlled to bring about a saving in cyclic time. There is also provided another embodiment, wherein multipliers of the third category are grouped with the second to save cycle time.

Provision is made to ascertain the characteristics of multiplier digits in different orders and to set up a set of controls in accordance therewith. If a multiplier order comprises a significant digit of value other than 1, i. e. from 2 through 9, a control is set up for such order. Another control is set up if the significant digit is 1 and a further control relation is set up if 0 stands in such order. In order to set up such controls for each order of the multiplier, there are list contacts, one for each multiplier order, and J relay contacts one for each different order. If a significant multiplier digit is entered in an order, the list contacts shift in the usual way. These list contacts are of the three-blade type. Current is supplied to the center blade from a source. Outer list contacts are connected to the controls as follows: One list contact for each order connects to a control relay common to all orders through a cam contact device, the cam contact closing for index points 2 to 9 only. This control when set determines that the multiplier digit in one or more of the various orders is a significant digit and of a value 2 through 9. The other list contact connects in a test circuit extending through the related J contact for that order. From the other side of the contact, there are two branch test circuits, one branch circuit extends through a circuit completed by a commutator to a particular control relay. The other branch extends through another commutator to a further control relay. The two commutators close at different index point times in the cycle, one closing just before index point 1 only, and the other closing only at the 0 portion. One control relay when set up determines a significant digit of 1 in the related order. The other relay when de-energized with its companion control relay also de-energized indicates a 0 condition for that order. These test circuits will now be more specifically described. From D. C. line 152 a circuit is completed through the units order 161 list contact, thence through the J—4 relay contact and then by branch paths to the other side of the line 151. One branch circuit from the J—4 contacts is completed by the brushes of the D—1 commutator, the circuit extending through a resistance 172 to a T relay, this particular relay being designated T$u$, "$u$" signifying units. The other branch path is completed through a D—2 commutator, the circuit extending to a K relay, here designated K$u$.

It will be understood that there is a T relay and a K relay for each order.

The timing of commutators D—1 and D—2 is as follows: D—1 (see Fig. 5) makes just before the one index point is reached. Commutator D—2 on the other hand makes at a later time, viz. at the zero index point.

Considering now a multiplier amount being entered into MP of 0019, the 161 list contacts in the units order will shift at the 9 index point time in the cycle. When such contacts shift at any index point from 9 to the second point, it will be impossible to energize either the Tu relay or the Ku relay. This provides one control relation. However, when any one of the list contacts 161 shift for index point positions 9 through 2 inclusive, an energizing circuit will be provided for relay coil EE, through cam contacts FC—14. The energizing circuit for this relay may be traced as follows: From line 152, through switch 162, through one of the 161 list contacts in shifted position, say the units order list contact, thence via wire through cam contacts FC—14, switch 181 through relay coil EE and back to the 151 side of the line. Relay coil EE being energized is maintained energized by stick contacts EE—1, the stick circuit being completed to line through FC—13.

Consider now the circuit relations in the tens order. The 161 list contacts related to the tens order will shift at the one index point time in the cycle, but before such contacts have shifted the Tt relay will have been energized. Each of the various relays Tu, Tt, etc., have stick contacts such as Tu—1, Tt—1, etc. The stick circuit is completed back to line through cam contacts FC—13. There would, however, be no energization of Kt because by the time the D—2 commutator makes in this order, the list contacts will have shifted to prevent the establishment of a circuit.

Consider now the hundreds order, here there is a zero. Under this condition the 161 list contacts do not shift at all. On the movement of the commutators there will first be an energization of Th followed by an energization of Kh.

Under the foregoing condition with Kh energized, the Kh—1 contact points open and these contact points are disposed in a low resistance shunt circuit around the 172 resistance for this order. Accordingly, when the Kh relay is energized, the Kh—1 contacts open and resistance 172 is cut into circuit with relay coil Th, decreasing its energization to such an extent that its stick contacts Th—1 reopen. Accordingly, under this zero condition, while there is a momentary energization of Th and Kh, the ultimate condition is that neither Th or Kh is energized.

The foregoing circuit and relay arrangement provides for the following control. If in any column of the multiplier the digit value is from 9 to 2, the related EE relay will be energized. If in any column of the multiplier the digit is a one, the T relay for that order will be energized. If in any column of the multiplier the amount is zero neither the K nor the T relay will be energized for that order.

Having set up the foregoing described controls, provision is made to ascertain whether the multiplier amount comprises a single "one" or more than one "one," in cases where the multiplier amount in any order does not comprise digits of values from 2 through 9. This is provided for as follows.

Referring to Fig. 4d, there is provided a relay coil AA which has one side connected to line 151. The pickup or energizing circuit for such relay AA is as follows: From line 152 through the closed EE—2 contacts, the cam contacts FC—15, through one or another of the T—2 relay contacts, such as Tu—2, thence there is a further control provided by the T—3 contacts, for example, Tu—3. The various T—3 contacts are serially connected as shown and associated with each T—3 contact is a resistance 174.

Assume now the multiplier amount to be one in the first category such as 0019. Under this condition, as explained above, relay coil EE will be energized. There will be accordingly no pickup circuit for relay circuit AA and such relay coil will remain de-energized.

Assume now a multiplier amount is 1 in the third category, such as 0011. Under this condition relay coils Tu and Tt would be energized and there would be a shift of the Tu—2 contacts, a shift of the Tt—2 contacts, a shift of the Tu—3 contacts and a shift of the Tt—3 contacts. With this contact relation, since the relay coil EE is now de-energized, a circuit would be completed through the EE—2 contacts, the FC—15 contacts, through Tu—2 and Tt—2 in parallel to wire 175, thence through the Tth—3 contacts, to the Th—3 contacts in the position shown, thence through the shifted Tt—3 contacts, through the resistance 174 for this order, through the shifted Tu—3 contacts, and the resistance for this order, thence to relay coil AA and back to the other side of the line. It will be noted that under this condition there are two resistances in series with relay coil AA. This will limit the energization of the relay to such an extent that it will not close its associated contacts including its stick contacts AA—1 and there will be no effective energization of relay coil AA.

Assume now a multiplier amount in the second category such as 0001. Under this condition Tu—2 would be closed and Tu—3 will be shifted. Upon closure of FC—15 a circuit is established from line 152, through EE—2, through Tu—2, to line 175, through the non-shifted T—3 contacts in series, through the Tu—3 contacts in shifted position through the resistance 174, to relay coil AA and back to line. With only one resistance in series with relay coil AA, such relay coil AA will be energized to a sufficient extent to close the stick contacts AA—1 and afford a stick circuit for relay coil AA back through cam contacts FC—16. Under this condition relay coil AA will be energized.

From the foregoing it will be noted that relay coil AA is only effectively energized when there is a single digit in the multiplier. With relay coil AA energized, relay contacts AA—13 (Fig. 4d) become closed and an energizing circuit is provided for relay coil BB traced as follows: From line 152, through the relay contacts FF—2 now closed, through the AA—13 contacts now closed, through cam contacts FC—9, to relay coil BB and back to line. BB once energized, is maintained energized by a stick circuit through stick contacts BB—1 and cam contacts FC—10.

Referring now to Fig. 4a, with relay coils AA and BB energized, their related contacts will be in shifted position and a circuit is completed from line 153, through the H—1 contacts now shifted, through cam contacts FC—5, through the AA—9 contacts now shifted, through the BB—9 contacts in shifted position, through the 163LH reset coil and back to ground. This will bring about LH reset. Under this control condition since relay contacts AA—10 are open there will be no energizing circuit for the RHA reset relay through the AA—10. Also since the BB—9 contacts are shifted there is no circuit through these contacts to the RHA relay. With RHA thus maintained de-energized, the RHA—1 contacts are open and 156RH does not become energized.

The above described controls provide for LH reset with the suppression of RH reset in the machine cycle, marked "2" in Fig. 7. Under the control condition just described multiplying is advanced one cycle and initiated in the cycle in which the LH reset is initiated. Under this control condition the first multiplication is effected in machine cycle 2 (Fig. 7).

With relay coil AA energized, the AA—11 contacts will shift and a circuit will be provided from line 152, through the shifted AA—11 contacts, the FC—3 contacts, to energize relay coils N and M. Energization of N and M sets up the cycle controller and initiates multiplying control in the usual manner.

Referring to Fig. 4c, with relay coil AA energized, the AA—2—8 contacts will also be in shifted position and the BB2—8 contacts will also be in shifted position since BB is energized. With such contacts shifted the product representing impulses will flow to the RH accumulator and entries into LH will be suppressed. Entries into LH will not occur because there is no LH component.

Referring now to Fig. 4d, with relay contacts BB—10 closed, upon closure of FC—11, relay FF will become energized being thereafter maintained energized by a stick circuit through stick contacts FF—1 and cam contacts FC—12. At the end of the single multiplying cycle, all the Y—2 contacts (Fig. 4a) will have shifted and upon re-closure of M—1 and closure of cam contacts CC—2, a reset initiating circuit is provided for the 156MC reset magnet and the MP reset magnet. However, under this control condition with relay coil AA energized, the AA—19 contacts are open so there is no energizing circuit provided for relay 1CR and accordingly no usually following RH to LH transfer ensues. Upon MC reset the various operations ensue which have been described for regular multiplying. On the cycle marked "4" (Fig. 7) with relay FF energized, relay contacts FF—3 (Fig. 4d) are closed. An energizing circuit is provided for relay coil DD through cam contacts FC—18. With relay coil DD energized, the DD1—8 contacts are in shifted position so that readout to the punch is provided from RHRO.

It may be mentioned that at this time the relay coil B is energized so that the B2—9 contacts are closed.

A further card reading cycle ensues during the same cycle in which amounts are being punched pertaining to the preceding calculation. It will be assumed that the following card is again a special card containing a single digit unit amount such as 0010. Such a multiplier amount will bring about an energization of relay coil AA in the manner previously explained. For this calculation the product amount is to be entered into LH with the reset of RH and the ultimate product to be read out from LH in place of from RH. This change of control is provided for in the following manner: With relay coil FF energized, the relay contacts FF—2 (Fig. 4d) are open so that there will be no energizing circuit for the relay coil BB.

Referring to Fig. 4a, the RH reset initiating circuit is as follows: From line 153, through H—1 shifted, through FC—5, through the now shifted AA—9 contacts, the non-shifted BB—9 contacts, the closed AA—12 contacts to relay coil RHA and back to ground. RHA when energized will close RHA—1 and a circuit will be provided from line through the 156RH reset magnet and thus bring about RH reset. During this same cycle LH reset is suppressed due to the fact that relay contacts AA—9 are in shifted position and also since the BB—9 contacts are in the position shown.

Initiation of multiplication is brought about under control of contacts AA—11 as described before. Under this type of operation FF will not become energized in the manner previously explained since the BB relay is de-energized, the BB—10 contacts are in open condition and there is no pickup energizing circuit for relay coil FF. Under this kind of a computation, referring to Fig. 4b, it will be noted that the BB—2—8 contacts are in the position shown since relay coil BB is de-energized. The AA—2 contacts are in shifted position since relay AA is energized. Accordingly with the AA2—8 contacts shifted and the BB2—8 contacts non-shifted, the product impulse circuit will extend to the LH accumulator instead of the RH accumulator. As before there is no left hand component of one.

Multiplication ensues in the usual way and upon the MP and MC reset cycle a new card feed is initiated. Under this operation relay FF is de-energized, accordingly, the FF—3 contacts (Fig. 4d) are open and there is accordingly no energization of DD when the FC—18 cam contacts close. With DD de-energized, during the cycle in which readout occurs to the punch, the readout circuits are extended to the LHRO readout in place to the RHRO readout. Accordingly, the amount is read out from the LH accumulator.

The complete sequence of operations have now been traced. It will be understood that if the following card is again a special card containing a multiplier amount of 1 only in any order, the operations will repeat, there being again a reversal of the reset relations and the readout relations for result recording.

The foregoing description has explained the special controls which are effective upon energization of relay coil AA. If relay coil AA does not become energized when the machine is performing a computation pertaining to any particular card, the control relations remain as in regular multiplying and the machine goes through the sequence of operation described for regular multiplying.

It will also be understood that if the machine is calculating a run of cards which involves special computations as well as regular computations, the control relations will change when required, that is, the machine may be operating with the sequence provided for special computations. Then if a multiplier amount is encountered such as 0019, the control relations will change to that effective in regular multiplying. Vice versa, if the machine is running on regular multiplying computations and a special computation appears on a card of the run the machine will change from the regular multiplying sequence to the special multiplying sequence.

In the foregoing description multiplier amounts such as 0011, 00111 and 1111, have been considered as being in the first machine operating category and to be handled like regular multiplying. It is possible, however, to control the machine when such amounts appear in the multiplier so that the machine will operate under the second category or for special computation sequences.

As explained before for the previously described embodiment, three machine cycles per card are required for multiplier amounts such as 01, 10, 100 or 1000. However, such machine when operating with multiplier amounts such as 1001, 0110 or 1010 would require five machine cycles per card, since the machine followed the regular sequence with such amounts. According to the modified control embodiment hereinafter described, operating time is saved for multiplier amounts such as 1001, 0110 or 1010. Such operations can be effected in four machine cycles per card.

Referring to Fig. 4d, there is provided a switch 176 which may be left in the open position shown or thrown to closed position to connect line 175 with a line 177. By throwing switch 176 to closed position connecting it to line 177, all of the T—3 contacts are shunted out of circuit. The T—3 contacts it will be recalled, were effective to allow energization of relay AA if a single T—3 contact was shifted and to prevent an energization of AA if more than one of the T—3 contacts were shifted. With switch 176 in closed position the aforementioned control is wholly ineffective. An AA energization is made dependent solely upon the EE—2 and the T—2 contacts.

As described above, relay coil EE becomes energized on any calculation wherein any multiplier digit in any column involves an amount from the 2 to 9 inclusive. With EE thus energized, the EE—2 contacts become open so that energization of AA is prevented. On a calculation wherein the card contains no digits in any order from 2 to 9 but which involves zeros and ones only, such as 01, 011, etc., the EE—2 contacts will remain closed and there will be an energization of one or more of the T relays. Under this control condition with switch 176 closed one or more of the T—2 contacts will close and afford an energization of relay coil AA. With such relay energized, the machine will proceed with the control relations for special computations for one or more orders of the multiplier and there will be an alternation of reset and readout as described for special computations for each of a series of special cards in a run.

Referring to the timing diagram (Fig. 5) and comparing with the timing diagram of Figs. 14b and 14c of Bryce Patent No. 2,106,477, it will be noted that the interposer timing and punch operating timing has been slightly modified with the instant construction. Both the interposer advance afforded by cam 106 and the actuation of the punches through the card afforded by punch cams 107 have been slightly advanced. Readout to the punch will have been completed prior to the closure of cam contacts FC-5 which initiate and cause instant clearing of the final result accumulator, or accumulators.

Referring further to the timing diagram (Fig. 5), it will be noted that the card stop 117 has been slightly modified in its time of operation over that shown in the Bryce patent. This change in card stop timing has been made due to the fact that with the present machine, cards are fed on alternate successive machine cycles. Accordingly, the card stop 117 is maintained up for one cycle. It is depressed before the beginning of the following machine cycle and again elevated toward the end of that cycle.

In certain types of accounting machines, the entry receiving devices which are utilized are frequently of a type which do not include the so-called list contacts 161 which have been described heretofore in connection with the description of the cycle controller. For such machines other means than the list contacts must be used for influencing and controlling the cycle controller. The said cycle controller determines whether a multiplier amount is one, such as 001, 0011, 0111 or 1111 or whether it is an amount such as 019, 0276, or 3764, etc. This alternate control embodiment in lieu of the list contacts will now be described.

To utilize such alternative control embodiment in lieu of the list contacts, certain modified circuit arrangements are used as shown in Figs. 4, 4a, 4aa, 4b, 4d and 4dd. Referring to Fig. 4dd, the circuit from cam contacts FC15 according to the modified embodiment now extends through line 177, through relay contacts AZ2 which are normally open. The circuit from the right hand end of relay coil EE according to the modified embodiment extends through normally open relay contacts EZ2. Referring to Figs. 4a and 4aa, according to the modified embodiment, the circuits which extend to plug sockets 158MP and to the Yth2 cycle controller contacts in the main embodiment (Fig. 4a) are modified according to Fig. 4aa. In this figure, supplemental relay coils E and A are in the series return circuit to ground between the 159MP magnets and ground. Supplemental cam contacts FC22 are adapted to shunt the E relay coil and such cam contacts FC22 are open from index point 9 through 2 inclusive. Accordingly, relay coil E will only be energized if one of the brushes senses an index point in the range from 9 through 2. E will not be energized if a one index point is sensed in any order because at this time the FC—22 contacts are closed.

Referring now to relay coil A, (Fig. 4aa) this coil is shunted by cam contacts FC—23, such contacts open at the one index point in the cycle. Accordingly, relay coil A will be energized only when a brush or brushes senses a "one" or "ones" in the multiplier field. Relay coil E, upon being energized, closes relay contacts E—1 (Fig. 4dd) and with such contacts closed a pickup circuit is established for relay coil EZ. Relay coil EZ upon energizing, closes stick contacts EZ—1, the stick circuit being completed back to line through cam contacts FC—20. With relay coil EZ thus energized, relay contacts EZ—2 close. A circuit is provided from line 152, through the EZ—2 contacts, relay coil EE to line 151. The above testing circuits and relays energize EE for any index point impulse from 9 through 2. EE after being energized is maintained energized through the EE—1 stick contacts and the cam contacts FC—13. The foregoing provides the modified control in lieu of the list contacts for the EE relay coil.

Upon energization of relay coil A (Fig. 4aa) which occurs when a "one" index point is sensed in an order or orders, relay contacts A—1 (Fig. 4dd) close. With such contacts closed, an energizing circuit is provided for relay coil AZ from line 152 to line 151. AZ energizing establishes a stick circuit through stick circuit through stick contacts AZ—1 and cam contacts FC—21. With relay coil AZ energized, relay contacts AZ—2 close. When cam contacts FC—15 close, an energizing circuit is provided for relay coil AA as follows: From line 152, (Fig. 4dd) through EE—2 closed, through FC—15, through the AZ—2 contacts to line 177, through relay coil AA and back to the other side of the line 151. The stick circuit for relay coil AA is however maintained through cam contacts FC—16.

It will be appreciated that with this embodiment, if relay EE had been energized, the EE—2 contacts would be open and there would be no energization of relay coil AA even though a one appeared in certain orders of the multiplier. In other respects the operation is the same as previously described.

What is claimed is:

1. A record controlled multiplying machine with means to handle a succession of records, factor sensing means for multiplier and multiplicand factors, factor receiving means controlled thereby, multiplying means controlled by said factor receiving means with dual accumulating means for the components of products and including in combination means controlled by the multiplier factor sensing means for providing representations of multiplier numbers for each order of the multiplier, testing means to test the representations provided by the foregoing means from each record of a run for zero or unity and to test such representations from all orders for the presence of digits from 9 through 2, including a plurality of control means one of which is set up upon the presence of digits from 2 to 9 in any order and the others of which are set up upon the presence of a unit or units only in an order or orders, a secondary control means controlled by both of the foregoing means, two means to initiate multiplying by the multiplying means, one initiating multiplying in a machine cycle which is advanced with respect to the other and means controlled by the secondary control means to determine which of the multiplying initiating means will cause initiation of multiplying.

2. A record controlled multiplying machine with means to handle a succession of records, factor sensing means for multiplier and multiplicand factors, factor receiving means controlled thereby, multiplying means controlled by said factor receiving means and including in combination separate resettable accumulators for left hand and right hand components of products, timed means for initiating reset of said accumulators, shiftable means to bring about concurrent or selective reset of said accumulators, record controlled testing means to test each record of a run for multiplier factor characteristics, including control means called into action by the testing means when the latter detects that any digit in any order comprises a digit from 9 through 2 to condition the shifting means for a concurrent reset of both accumulators, and control means called into action by the testing means when the latter detects zero and unity characteristics for all orders to condition the shiftable means for the selective reset of one of the accumulators.

3. The machine according to claim 2 wherein further control means are provided called into action by the testing means upon detecting zero or unity characteristics on following successive cards of a run for conditioning the shiftable means for alternating reset of the said separate accumulators during operations under control of successive cards.

4. In a record controlled and record making multiplying machine, including means to handle a succession of records, means to sense factor data on each record, means to receive such data, multiplying means controlled by the receiving means for multiplying such data, separate component result receiving accumulators, and recording means controlled thereby for recording results on each record, including in combination routing means for alternating the routing of right hand components of products into different receiving means upon successive computations pertaining to successive records of a run when multiplications involve only right hand components, routing means for alternating which of the two accumulators controls result recording, selectively settable reset control means for the two result accumulators to alternate the reset of such accumulators and a set of selectively operable control means functioning in different combinations and including cyclically operable devices for selectively controlling both of the foregoing routing means and the reset control means.

5. A record controlled multiplying machine with means to handle a succession of records, factor sensing means for multiplier and multiplicand factors, factor receiving means controlled thereby, multiplying means controlled by said factor receiving means and including in combination, a record controlled machine cycle controller for distinctively detecting whether a digit or the significant digits of a factor amount of each record of a run are "one" or "ones" so as to require only a single component multiplication or of other digital values so as to require a double component multiplication, said machine cycle controller including testing means to test and analyze entries into a factor receiving means, control means controlled by the testing means and variably set according to whether single or double component multiplication is detected, a secondary control device controlled by the foregoing control means, separate resettable accumulators for left hand and right hand components of products, timed means for initiating reset of said accumulators, shiftable means to bring about concurrent or selective reset of said accumulators, means controlled by the aforesaid secondary control means when in one status to condition the shiftable means for a concurrent reset, and means controlled by the secondary control means when in another status to condition the shiftable means for effecting one of said selective resets.

6. A control device for determining one machine operation or another of a record controlled multiplying machine, comprising record controlled entry receiving means, set up means for each order of an entry in said receiving means, each set up means being operated at differential times according to the digital magnitude of an entry and not affected upon a zero entry, means to test the set up means in each individual order to ascertain if a significant digit of a predetermined magnitude is entered in any one or more of the orders or the absence of an entry in an order or orders, further testing means to test the set up means in all orders conjointly to ascertain if a significant digit or digits of other magnitudes are entered in any one or more of the orders, and control means controlled conjointly by both of the foregoing testing means for determining one machine operation or another.

7. A control device for controlling variable sequences of machine operations of a multiplying machine, said machine having a multi-denominational entry receiving device into which amounts are entered and including in combination, testing means to test and analyze representations of entries into said receiving device to determine whether significant digital entries are all of a same predetermined magnitude, further testing means to also test and analyze representations of entries into said receiving device to determine whether a significant digital entry in any order differs from said predetermined magnitude, a plurality of accumulators for receiving product entries, and timed means for initiating reset of said accumulators, shiftable means to bring about concurrent or selective reset of said accumulators, reset control means called into action conjointly by said first mentioned testing means and said last mentioned testing means to condition the shiftable means for a concurrent reset or for one of said selective resets.

8. In a record controlled multiplying machine with means to handle a succession of records, factor sensing means for multiplier and multiplicand factors, receiving means controlled thereby, multiplying means controlled by said receiving means with left hand and right hand component accumulators, one of which comprises a final result accumulator and wherein record sensing, reset of the final result accumulator, and multiplying, occur in successive machine cycles, and including in combination, record controlled means to detect "one" or "ones" in each record of a run, supplemental operation initiating means for the multiplying means, means controlled by the foregoing record control detecting means upon detecting such characteristics to control said supplemental operation initiating means and cause multiplying by the multiplying means to occur concurrently during the machine cycle in which the final result accumulator containing the previous product is being reset whereby machine operating time may be saved.

9. In a record controlled and record making multiplying machine, with means to handle a succession of records, means to sense each record for multiplier and multiplicand factor amounts, receiving means for multiplier and multiplicand factors, multiplying means controlled thereby and forming right hand and left hand partial products, left hand and right hand component result accumulators and recording means controlled upon normal multiplication to record results standing in the left hand accumulator and including in combination shiftable means to divert the routing of right hand component entries from the right hand accoumulator into the left hand accumulator, a record controlled machine cycle controller for distinctively detecting whether a significant digit or digits of a factor amount of each record of a run are "one" or "ones" so that they will require a single component multiplication or other digital values such as will require a double component multiplication, said machine cycle controller including testing means to test and analyze entries into a factor receiving means to determine whether the amount entered therein requires a single or a double component multiplication, control means controlled by the testing means and variably set according to whether a single or double component multiplication is detected, and a secondary control device controlled by the last mentioned means and comprising cyclically operable elements for selectively controlling the shiftable means and causing the same to divert RH components into the LF accumulator when the control means is set up for two records in succession for single component multiplications.

10. A record controlled multiplying machine with means to handle a succession of records, factor sensing means for multiplier and multiplicand factors, factor receiving means controlled thereby, multiplying means controlled by said factor receiving means with result receiving means, and including in combination, a record controlled machine cycle controller for distinctively detecting whether a digit or the digits of a factor amount on each record of a run are "one" so as to only require a single component multiplication or other digits from 2 through 9 so as to require a double component multiplication, said cycle controller including control devices brought into action when an amount is detected on a record requiring single component multiplication. said cycle controller also including a further control device brought into action when an amount is detected on a different record requiring double component multiplication, a secondary control means controlled by both of the foregoing means, two means to initiate multiplying by the multiplying means, one initiating multiplying in a machine cycle which is advanced with respect to the other, and means controlled by the secondary control means to determine which of the initiating means will cause initiation of multiplying.

11. In a record controlled and record making multiplying machine with means to handle a succession of records, means to sense each record for factor data, receiving means for two factors, multiplying means controlled thereby with left hand and right hand component result accumulators, and recording means controlled upon normal multiplication to record results standing in the left hand accumulator, and including in combination, shiftable means to place the right hand accumulator in control of the recording means whereby the result is recorded from the right hand accumulator, record controlled testing means to test each record of a run for multiplier digit characteristics, and control means for the shiftable means called into action by the testing means when the latter detects that any digit in any order comprises a digit from 2 to 9 to maintain the shiftable means ineffective so as to afford normal recording under the control of the left hand accumulator, said control means on being called into action by the testing means when the latter detects only unity characteristics conditioning the shiftable means for effecting recording under control of the right hand accumulator.

12. A machine according to claim 11 wherein the control means for the shiftable means comprises instrumentalities effective upon passage of leading and following successive records of a run, which records bear multiplier representations of unity characteristics, to cause alternating action of the shiftable means to effect alternate recording first from one accumulator and then from the other accumulator upon alternate records.

13. In a record controlled and record making multiplying machine with means to handle a succession of records, means to sense each record for factor data, receiving means for two factors, multiplying means controlled thereby with left hand and right hand component result accumulators and recording means controlled upon normal multiplication to record results standing in the left hand accumulator and including in combination, shiftable means to place the right hand accumulator in control of the recording means whereby the result is recorded from the right hand accumulator, a record controlled machine cycle controller for distinctively detecting whether a digit or the significant digits of a factor amount of each record of a run are "one" or "ones" so as to only require single component multiplication or of other digital values so as to require double component multiplication, said machine cycle controller including testing means to test and analyze representations of entries into a factor receiving means, and further including control means variably set according to whether a factor requiring single or double component multiplication is detected, and means controlled by said last mentioned means and cyclically operable means for selectively controlling the shiftable means to place the left hand accumulator in control of the recording means when a double component multiplication is being effected, whereby the result may be recorded from such accumulator and to place the right hand accumulator in control of the recording means when a single component multiplication is being effected, whereby the result is recorded from such accumulator.

14. The machine according to claim 13 wherein the means for controlling the shiftable means comprises instrumentalities to cause alternating action of the shiftable means and effect alternate recording first from one accumulator and then from the other when successive records are detected in a run with factor amounts on each record requiring single component multiplication.

15. A machine according to claim 6, wherein further means are provided under control of said individual order testing means to prevent operation of said control means when the number of digits of said predetermined magnitude exceeds 1.

ARTHUR H. DICKINSON.

CERTIFICATE OF CORRECTION.

Patent No. 2,264,622.                                    December 2, 1941.

ARTHUR H. DICKINSON.

It is hereby certified that error appears in the printed specification of the above numbered patent requiring correction as follows: Page 3, second column, line 30, for "in" read --is--; page 8, first column, line 22, strike out "also"; page 11, first column, line 69, claim 9, for "LF" read --LH--; and that the said Letters Patent should be read with this correction therein that the same may conform to the record of the case in the Patent Office.

Signed and sealed this 3rd day of February, A. D. 1942.

(Seal)

Henry Van Arsdale,
Acting Commissioner of Patents.